Patented June 11, 1935

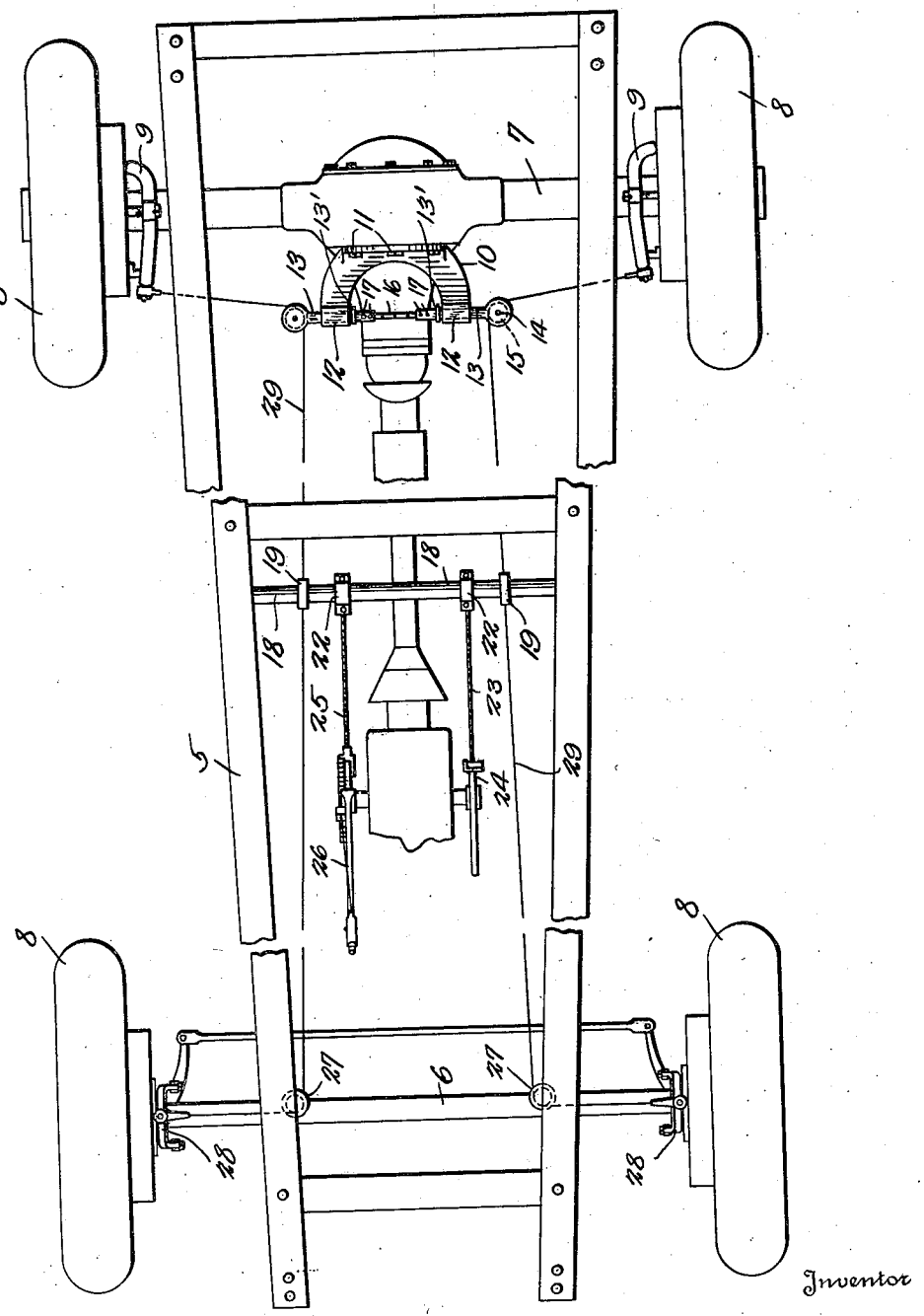

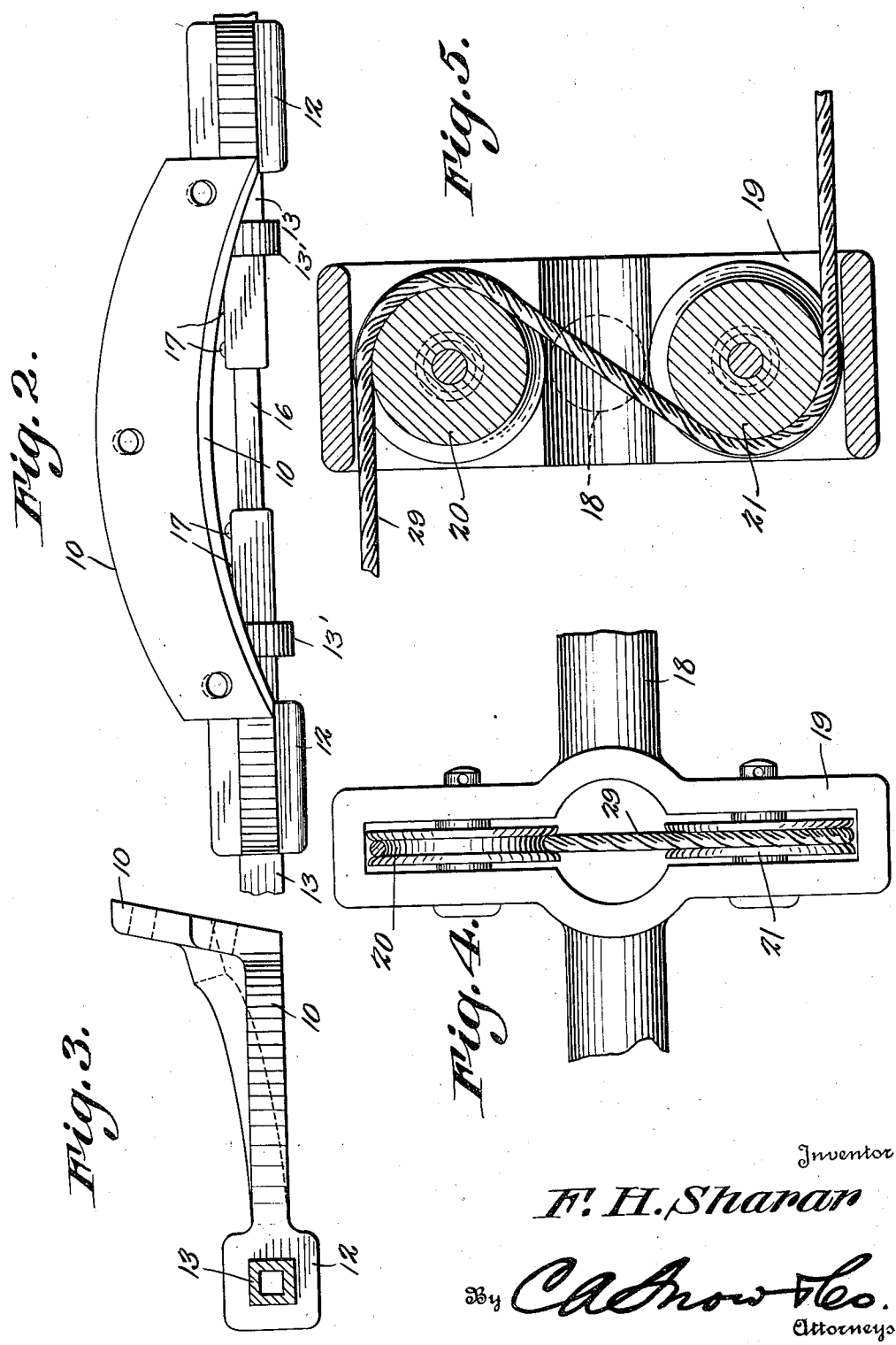

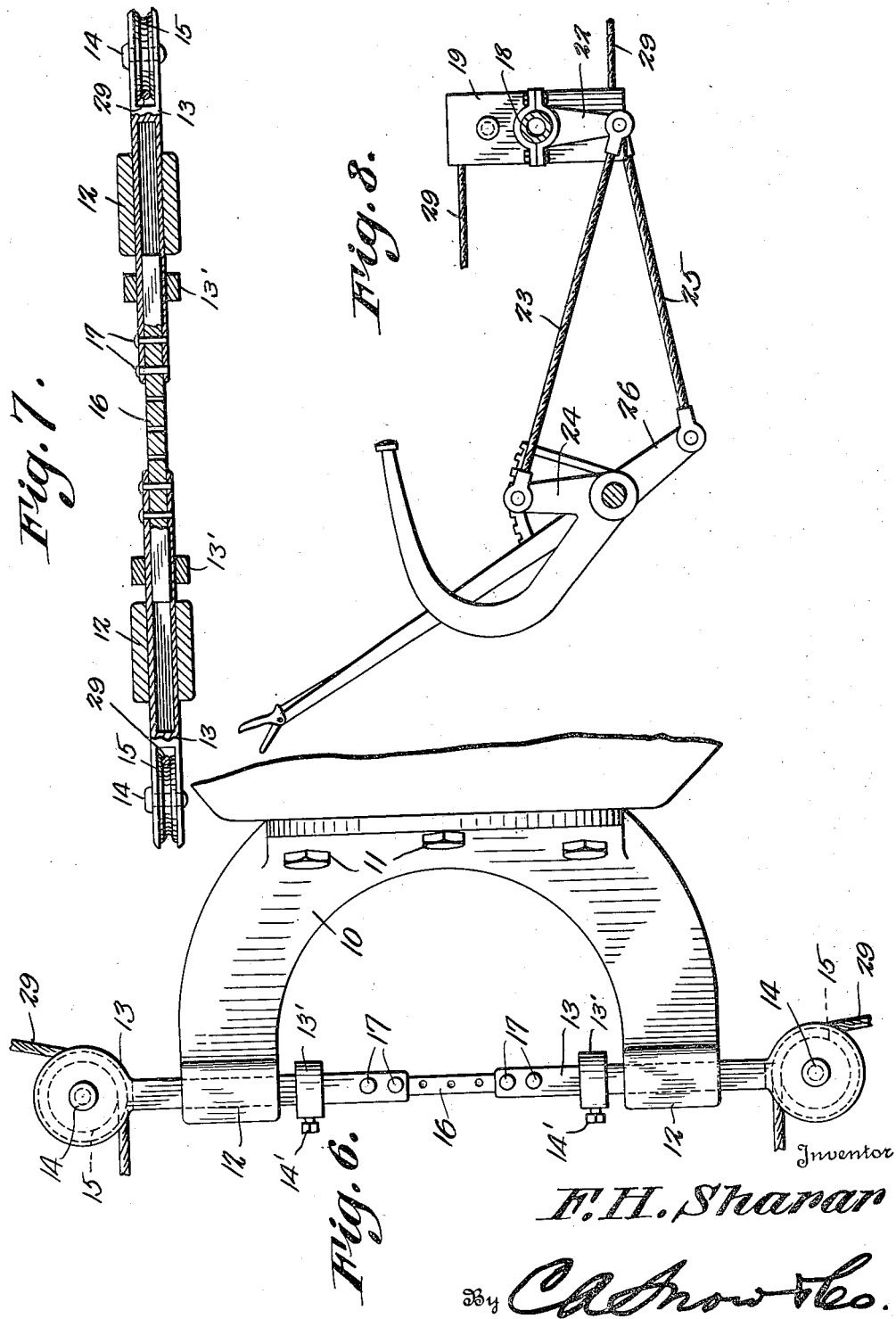

2,004,556

UNITED STATES PATENT OFFICE 2,004,556

MOTOR VEHICLE BRAKE

Fred H. Sharar, Williamsport, Pa.

Application September 16, 1932, Serial No. 633,501

3 Claims. (Cl. 188—204)

This invention relates to brake operating mechanism, and more particularly to a brake operating mechanism designed for operating mechanical brakes of motor vehicles.

The object of the invention is to provide an operating mechanism of this character which will automatically equalize the pulling strain directed to the brakes, thereby insuring an even application of the brakes at all times.

A further object of the invention is to provide an operating mechanism of this character which embodies but few parts, and a mechanism which may be readily and easily installed, without the necessity of making alterations in the general construction of the vehicle chassis or brake operating means.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of a motor vehicle chassis, showing a brake operating mechanism constructed in accordance with the invention, as installed.

Figure 2 is a rear elevational view of the bracket that is bolted to the differential housing of the vehicle.

Figure 3 is an end elevational view thereof.

Figure 4 is an elevational view of the pulley supporting yoke.

Figure 5 is a vertical sectional view through the yoke.

Figure 6 is a plan view of the bracket.

Figure 7 is a longitudinal sectional view through the sliding pulley supporting arms of the mechanism.

Figure 8 is an elevational view of the rocker arm and the levers for operating the rocker arm.

Referring to the drawings in detail, the reference character 5 designates the chassis of a motor vehicle, which is supported on the front and rear axles 6 and 7 respectively, on which the wheels 8 are mounted.

The brake operating mechanism includes pivoted arms 9 that have outwardly curved end portions which operate the brake mechanism shown in my co-pending application, filed September 8, 1932, Serial Number 632,211.

The reference character 10 designates a bracket that has a curved flange curved to fit the differential housing of a motor vehicle, there being provided bolts 11 extended through openings in the flange, for securing the bracket in position. Bearings 12 are formed in the ends of the bracket 10, the bearings 12 being square in formation, to receive the rods 13 which are square in cross section, the rods being designed to permit of free sliding movement within the bearings.

Stop collars 13' are mounted on the rods 13, and are adjustable longitudinally thereof, set screws 14' being provided for holding the stop collars in various positions of adjustment. Due to the stop collars, it will be seen that should one of the cables or ropes 29 break, the rods will move in the opposite direction, the stop collar 13' adjacent to the cable or rope which is not broken, being moved with its rod, to engage the bearing 12 adjacent thereto, thereby insuring the operation of the brakes at one side of the vehicle.

The outer ends of these rods are enlarged and formed with openings to receive the pins 14 on which the pulleys 15 are mounted. Square bores are formed in the rods 13 and extend inwardly from the inner ends thereof, the bores being designed to receive the bar 16, which is formed with a plurality of openings to receive the bolts 17.

These bolts 17 also operate through openings formed in the rods 13, to the end that the rods 13 may be adjusted towards and away from each other to set the normal positions of the arms 13, when it becomes necessary to take up slack in the cables.

The operating mechanism also embodies a rocker shaft 18 that has its ends mounted in bearings formed in the side rails of the chassis of the vehicle at a point substantially intermediate the ends of the side rails.

Formed integral with the shaft 18 are yokes 19, the yokes being disposed near the outer end of the shaft. Each of these yokes includes an elongated member comprising spaced walls between which the pulleys 20 and 21 are mounted.

Connected with the shaft 18, are rocker arms 22, that extend downwardly therefrom, there being provided a cable 23 connected with one of the rocker arms, and connected with the foot brake 24, so that when the foot brake is operated, the rocker arm will be moved to rotate the rocker shaft 18, to accomplish the purpose of the invention.

The rocker arm near the opposite end of the shaft 18, has connection with the operating cable 25, that extends forwardly and has pivotal connection with the hand lever 26, so that the rocker shaft 18 may be operated by the hand lever or emergency brake lever.

Pulleys 27 are mounted on the side rails of the chassis near the front axle 6 of the vehicle, so that the cables, which form a part of the operating mechanism, may pass laterally to the arms 28 of the front wheel brake operating mechanism as shown in my co-pending application.

The cables or ropes, are indicated by the reference character 29, and as shown, the cables have their ends connected to the brake operating arms at the front and rear of the vehicle, the intermediate portions of the cables or ropes, passing over the pulleys 20 and 21, in a manner as shown by Figure 5 of the drawings.

Thus it will be seen that as the rocker shaft 18 is operated, the yokes will swing, causing the cables or ropes to be tightened, resulting in the operation of the brake arms and brake mechanism.

It will be obvious that due to the construction shown, the cables or ropes will automatically adjust themselves by moving over the pulleys, to the end that the strain directed to the cables or ropes, will be equalized resulting in an easy operation of the brake mechanism.

Having thus described the invention what is claimed is:

I claim:

1. A motor vehicle brake actuating device comprising a bracket adapted to be attached to a part of the vehicle, arms on said bracket having bearings, rods slidably mounted within the bearings, means for restricting outward movement of the rods, pulleys mounted at the outer ends of the slidable rods, cables connected to the brakes of the vehicle and operating over the pulleys, and means for operating the cables.

2. A motor vehicle brake actuating device comprising a bracket adapted to be attached to a part of the vehicle, arms on said bracket having bearings, rods slidably mounted within the bearings and adjustably connected with each other, means for restricting outward movement of the rods, pulleys mounted at the outer ends of the slidable rods, cables connected to the brakes of the vehicle and operating over the pulleys, and means for operating the cables.

3. A motor vehicle brake actuating device comprising a bracket adapted to be attached to the differential housing of the vehicle, arms having bearings, extending from the bracket, rods slidably mounted within the bearings, adjustable collars on the slidable rods and adapted to engage the bearings restricting movement of the slidable rods, pulleys at the outer ends of the rods, cables operating over the pulleys and having connection with the brakes of the vehicle, and means for operating the cables to operate the brakes.

FRED H. SHARAR.